(12) United States Patent
Sykes et al.

(10) Patent No.: US 9,568,275 B2
(45) Date of Patent: Feb. 14, 2017

(54) MULTI-MATERIAL HANDGUN HOLSTER

(71) Applicant: Kinetic Concealment, Inc., Jackson, TN (US)

(72) Inventors: Joshua Sykes, Jackson, TN (US); Christopher George Harless, Orlando, FL (US)

(73) Assignee: Kinetic Concealment, Inc., Jackson, TN (US)

( * ) Notice: Subject to any disclaimer, the term of this patent is extended or adjusted under 35 U.S.C. 154(b) by 87 days.

(21) Appl. No.: 14/579,461

(22) Filed: Dec. 22, 2014

(65) Prior Publication Data

US 2016/0102940 A1    Apr. 14, 2016

Related U.S. Application Data

(60) Provisional application No. 61/963,867, filed on Dec. 17, 2013.

(51) Int. Cl.
| | |
|---|---|
| *F41C 33/04* | (2006.01) |
| *F41C 33/02* | (2006.01) |
| *B32B 5/02* | (2006.01) |
| *B32B 27/30* | (2006.01) |
| *B32B 3/08* | (2006.01) |

(Continued)

(52) U.S. Cl.
CPC ............. *F41C 33/048* (2013.01); *B32B 3/08* (2013.01); *B32B 5/02* (2013.01); *B32B 9/045* (2013.01); *B32B 27/304* (2013.01); *B32B 27/308* (2013.01); *F41C 33/0236* (2013.01); *B32B 3/266* (2013.01); *B32B 7/08* (2013.01); *B32B 7/12* (2013.01); *B32B 9/025* (2013.01); *B32B 9/043* (2013.01); *B32B 25/10* (2013.01); *B32B 25/16* (2013.01); *B32B 2270/00* (2013.01); *B32B 2307/51* (2013.01); *B32B 2307/546* (2013.01); *B32B 2307/56* (2013.01); *B32B 2307/724* (2013.01); *B32B 2307/7246* (2013.01); *B32B 2437/00* (2013.01); *B32B 2439/02* (2013.01)

(58) Field of Classification Search
CPC ............ F41C 33/04; F41C 33/02; B32B 9/02; B32B 9/04; B32B 5/02; B32B 7/12
USPC .......................................... 224/587, 907, 911
See application file for complete search history.

(56) References Cited

U.S. PATENT DOCUMENTS

| | | | |
|---|---|---|---|
| 3,583,612 A * | 6/1971 | Theodore | ............ F41C 33/0227 224/243 |
| 3,942,692 A | 3/1976 | Chica | |

(Continued)

*Primary Examiner* — Brian D Nash
(74) *Attorney, Agent, or Firm* — Wood Herron & Evans LLP

(57) ABSTRACT

Disclosed is a holster for concealment inside a waistband of a lower garment of a user. The holster includes a support sheet having first and second surfaces and made of at least first and second layers of different material. The first layer comprises a pliable leather material and the second layer comprises a resilient elastomeric cushion material. The second layer is positioned inward toward the user relative to the first layer when the holster is in use. A rigid shell member is attached to the support sheet and forms, with the first side of the support sheet, a pocket configured to encase a portion of a handgun. At least one garment attachment member is provided on the support sheet and is configured to support the holster inside a waistband of a lower garment of a user. In one example, the resilient elastomeric cushion material may be neoprene.

13 Claims, 3 Drawing Sheets

(51) Int. Cl.
*B32B 9/02* (2006.01)
*B32B 9/04* (2006.01)
*B32B 7/12* (2006.01)
*B32B 7/08* (2006.01)
*B32B 25/16* (2006.01)
*B32B 25/10* (2006.01)
*B32B 3/26* (2006.01)

(56) References Cited

U.S. PATENT DOCUMENTS

| | | | |
|---|---|---|---|
| 4,667,374 A | 5/1987 | Bianchi | |
| 4,718,585 A | 1/1988 | Atkins, Sr. | |
| 4,741,465 A * | 5/1988 | Johnson | F41C 33/0209 224/230 |
| 5,054,671 A * | 10/1991 | Else | F41C 33/0209 224/192 |
| 5,103,884 A | 4/1992 | Roman | |
| 5,265,781 A * | 11/1993 | Nichols | F41C 33/0227 224/197 |
| 5,282,559 A * | 2/1994 | Wisser | F41C 33/0227 224/193 |
| 5,909,834 A * | 6/1999 | Parrott, III | F41C 33/0209 224/245 |
| 6,089,432 A * | 7/2000 | Gage | F41C 33/0227 224/191 |
| 6,092,703 A | 7/2000 | Johnson | |
| 7,314,152 B1 | 1/2008 | Garrett | |
| 8,672,201 B2 | 3/2014 | Craighead | |
| 2006/0219743 A1* | 10/2006 | Gallagher | A45F 5/02 224/192 |
| 2010/0108728 A1* | 5/2010 | Castaneda | F41C 33/0209 224/243 |
| 2010/0181353 A1 | 7/2010 | Craighead | |
| 2010/0270349 A1* | 10/2010 | Craighead | F41C 33/041 224/587 |
| 2013/0181021 A1* | 7/2013 | Yarbrough | F41C 33/0263 224/244 |

* cited by examiner

MULTI-MATERIAL HANDGUN HOLSTER

CROSS-REFERENCE TO RELATED APPLICATIONS

This application claims the benefit of and priority to U.S. Provisional Patent Application No. 61/963,867 filed on Dec. 17, 2013.

TECHNICAL FIELD

The invention generally relates to holsters, particularly for the carrying of concealed handguns. More specifically, this invention relates to such a holster made from a unique combination of multiple materials.

BACKGROUND

It is known to make concealable handgun holsters from certain combinations of materials. For example, a pocket to hold the handgun may be formed on one side from a relatively rigid thermoplastic material, such as KYDEX®, which is secured to a relatively more flexible sheet of material, such as leather, to form an opposite side of the pocket and to extend outwardly beyond the periphery of the rigid portion for mounting belt clips made of plastic or spring steel. Examples of such holsters are shown in U.S. Patent Application Publication No. 2010/0181353 and U.S. Pat. No. 8,672,201. Carrying a handgun for personal protection is often done in a concealed manner. Doing so provides for desired accessibility and protection without being ubiquitous to others in your vicinity. A variety of holsters have been developed to accommodate concealed carry of a handgun and/or accessories, such as an extra ammunition magazine or flashlight.

A typical belt holster can securely and conveniently hold a handgun and/or accessory item, but relies on some form of cover garment to make it concealed. A more easily concealable type of handgun holster is one worn inside the waistband (IWB) of a lower garment (such as pants or a skirt) and is held tightly against one's body by a belt or the waistband of the garment. Typically, an IWB holster includes one or more attachment clips which support the holster (and the handgun or other accessory held by it) on the belt or waistband. In order to minimize the thickness and bulk added by a holster to the item being concealed, these clips are typically positioned lateral to the pocket that receives the item. Other extensions of an IWB holster may provide a shield to prevent the muzzle or grip of the handgun from directly contacting the wearer's body.

Leather is a traditional material from which holsters have been constructed for many years. However, the pocket of an IWB holster made entirely of leather will usually collapse under the compression force of the waistband or belt when the handgun or other item is removed, making reholstering more difficult. In some cases, an extra layer of leather or some other stiffening material is used to keep the mouth of the pocket open and resist collapse. A more recently developed and popular design for IWB holsters has been to attach a rigid outside encasement member to a sheet of leather, together forming the holster pocket. The pliable leather sheet rests against the user's body and extended areas of the leather sheet provide attachment locations for one or more belt clips, allowing the holster to conform to the curved shape of the user's body. The rigid outer shell is formed to fit the handgun or other item being held and maintains its shape even when the handgun is removed.

Unless "finished" on both sides, natural leather typically has a rough side and a smooth side. In IWB holsters, the rough side of the leather sheet is typically positioned toward the user's body with the smooth side toward the handgun in order to allow the handgun to be removed from the holster pocket with less friction and to help keep the holster in place on the user's body as the handgun is being drawn.

While leather is quite durable and resists stretching, while allowing a suitable amount of flexure, the rough side of the leather can be uncomfortably abrasive when held directly against the user's skin or undergarment. Leather is also not particularly breathable, causing perspiration to accumulate between the holster and the user's body or absorbing the perspiration moisture, which undesirably exposes the handgun to moist and corrosive salts.

An IWB holster is needed, made of materials that retain all of the desired qualities described above while minimizing or eliminating the undesirable qualities.

SUMMARY

The present invention provides a holster handgun for a handgun or other item to be concealed inside a waistband of a lower garment of a user. The holster includes a support sheet having first and second surfaces and comprising at least first and second layers of different material. The first layer may include a pliable leather material and the second layer may include a resilient elastomeric cushion material. The second layer is positioned inward toward the user relative to the first layer when the holster is in use. A rigid shell member is attached to the support sheet and forms, with the first side of the support sheet, a pocket configured to encase at least a portion of a handgun or other item to be held by the holster. There is at least one garment attachment member on the support sheet configured to support the holster inside a waistband of a lower garment of a user.

In one embodiment, the resilient elastomeric cushion material may be neoprene. The second surface may comprise a layer of fabric.

The first and second layers may be secured together by adhesive and/or by peripheral stitching. The shell member bay be attached to the support sheet by a plurality of fasteners, such as Chicago screws. The garment attachment member may be in the form of a clip that engages an upper edge of the user's lower garment or a belt worm by the user. The support sheet may be configured to provide multiple attachment positions for the shell member and/or for the garment attachment member.

BRIEF DESCRIPTION OF THE DRAWINGS

The invention will be more readily understood by reference to the Detailed Description in conjunction with the following figures. Like reference numerals are used to indicate like parts throughout the various figures of the drawings, wherein.

DETAILED DESCRIPTION

Figure 1:
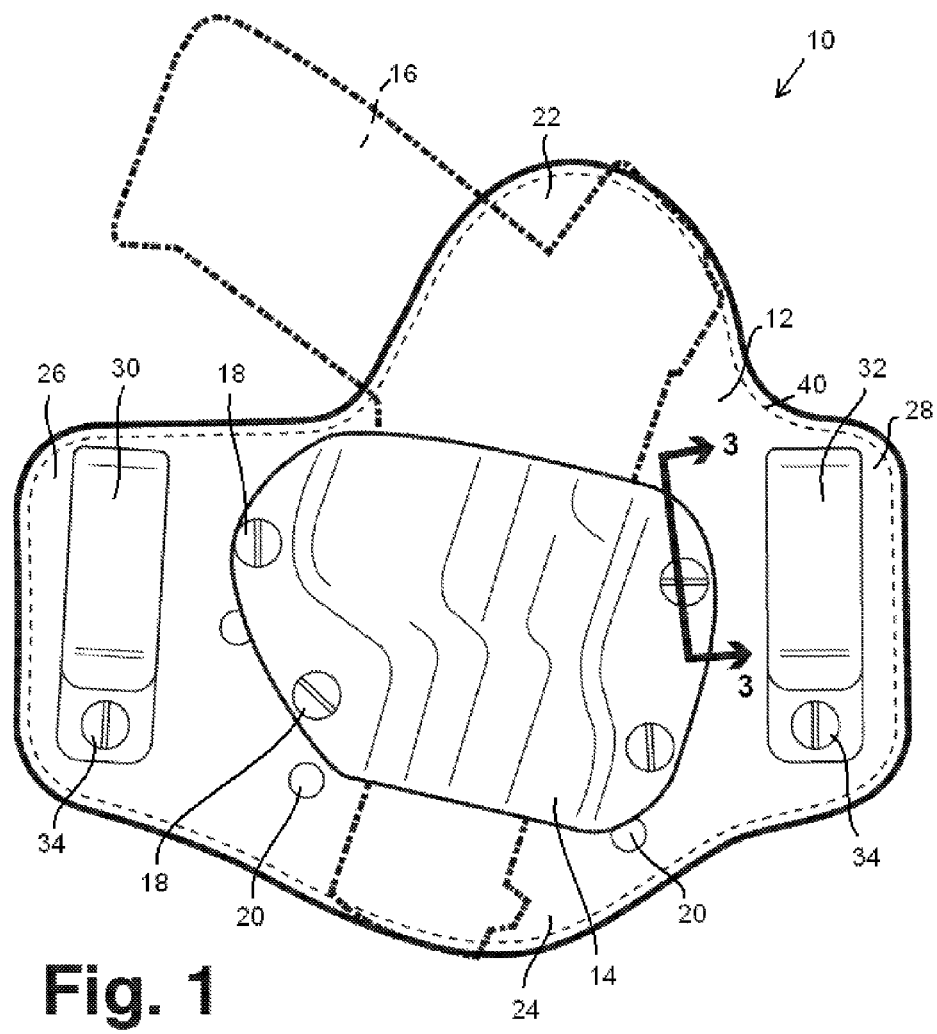
FIG. 1 is a plan view of the outside surface of a holster made in accordance with an embodiment of the present invention with the silhouette of a handgun shown in phantom line.
Figure 2:
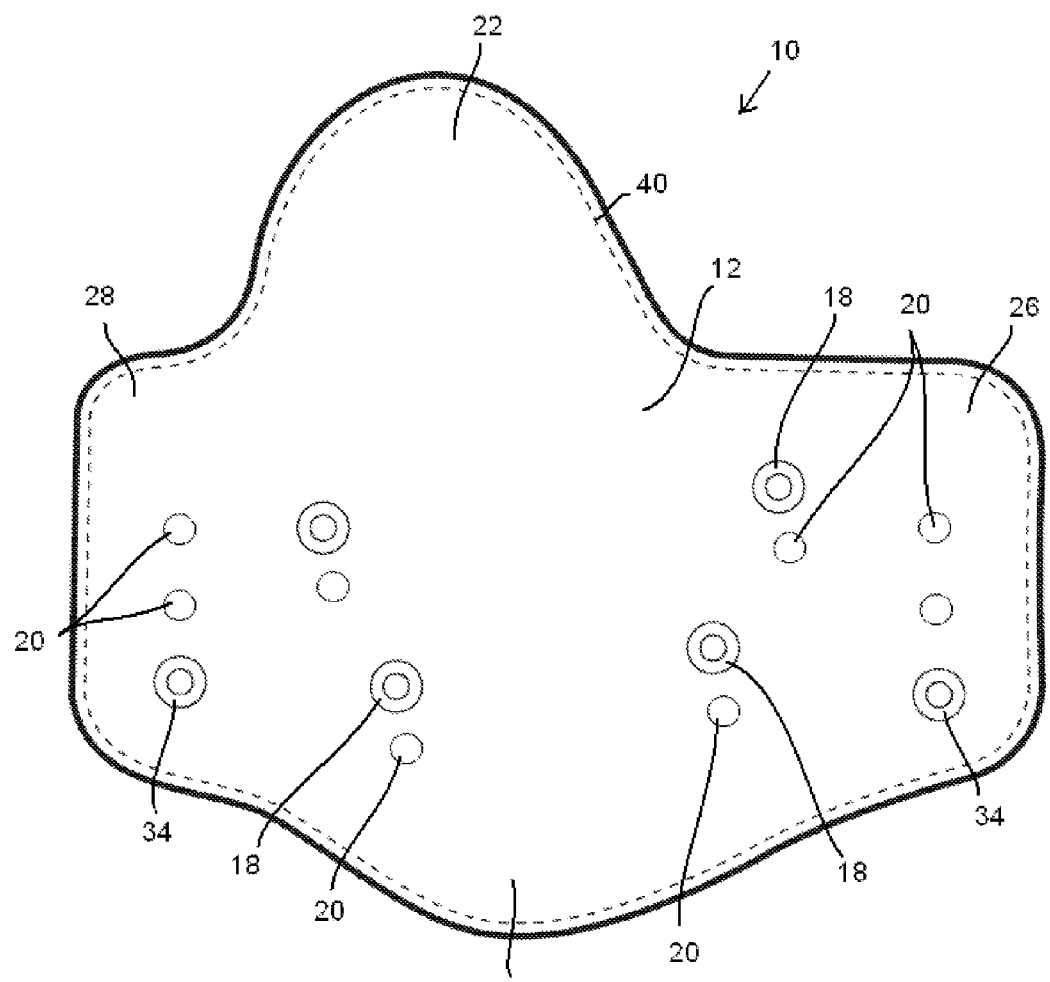
FIG. 2 is a plan view of the inside surface of the holster.

Referring to the various figures of the drawings, and first to FIG. 1, therein is shown at 10 an inside-the-waistband (IWB) holster illustrating one embodiment of the present invention. In this embodiment, the holster 10 includes a sheet of backing material 12 and a rigid shell member 14, which together securely hold a handgun (shown in phantom line at 16). Although the illustrated embodiment is shown and described with respect to a holster for a handgun, the term is to be understood to include and encompass a holster for holding an ammunition magazine, flashlight, or other accessory securely and concealed inside the waistband. The backing sheet 12 is somewhat flexible to conform to the curvature of the user's body. Structural details of the backing sheet 12 will be described separately below. The rigid shell 14 is made from a strong and highly rigid, but thermoformable plastic material, typically an acrylic-PVC alloy, such as KYDEX® (a registered trademark of Kydex LLC, Bloomsburg, Pa.). The shell is shaped to cover a sufficient portion of the handgun to hold it securely and to cover the trigger with the grip exposed to allow a smooth draw from concealment. The rigid shell 14 may be attached to the backing sheet 12 with a plurality of fasteners 18. The fasteners 18 may be rivets or a removable threaded fastener device, such as "Chicago" screw, widely used in the construction of holsters. The fasteners 18 may extend through openings in the rigid shell 14 and openings 20 in the backing sheet 12. Referring now also to FIG. 2, additional openings 20 may be provided in the backing sheet 12 to allow repositioning of the rigid shell 14 to adjust the height and angle at which the handgun 16 is carried.

In addition to providing an inward enclosure wall opposite the rigid shell 14, the backing sheet 12 may include various extension portions. An upper portion 22 may provide a protective barrier between a portion of the handgun 16 that extends beyond the area covered by the rigid shell 14. This upper portion 22 is commonly referred to as a "sweat shield" and prevent uncomfortable direct contact between the handgun and the user's skin or undergarment. A lower portion 24 may provide a similar barrier between a muzzle portion of the handgun 16 that extends downwardly with or beyond the rigid shell 14. Lateral portions 26, 28 are situated to be generally parallel to or adjacent the waistband of the user's garment and provide attachment locations for garment attachment members, such as clips 30, 32, to be attached to the backing sheet 12 with fasteners 34. The attachment clips 30, 32 may also be adjustably positioned on the backing sheet 12 and support the holster 12 on the user's waistband and/or belt in a well known manner. Multiple openings 20 for the fasteners 34 holding the attachment clips also allow the position or angle at which the holster 10 is carries to be adjusted. The clips 30, 32 may be made of metal, such as, spring steel or a thermoformable rigid plastic, such as KYDEX®.

Holsters of the general type described above have been referred to as "hybrid" holsters, in that they are made of a combination of different materials, typically a rigid thermoformable material for the shell 14 and sturdy, tanned leather for the backing sheet 12. Leather provides desirable qualities for this use in that it is sufficiently pliable to conform to the curve of a user's waistband, yet resists stretching to provide a fixed foundation for mounting the rigid shell 14 and/or clips 30, 32. As used herein, the term "leather" is intended to include natural leather, bonded leather, or synthetic leather-like materials.

Figure 3:
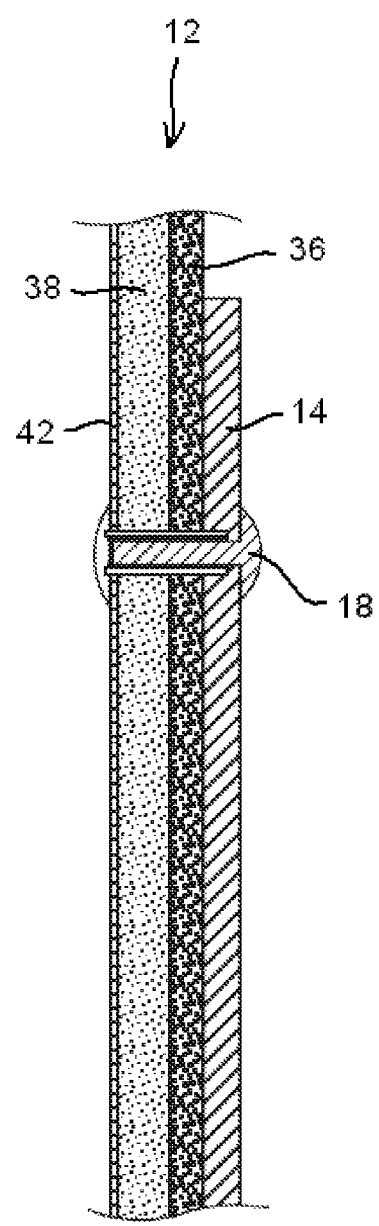
FIG. 3 is a cross-sectional view taken substantially along line 3-3 of FIG. 1.

The present invention improves upon the previously known concealable IWB "hybrid" holster described above by providing cushioning on the inwardly facing side of the backing sheet 12 by combining a sheet of cushioning material with a sheet of leather material. Referring in particular to FIG. 3, therein is shown that the backing sheet 12 may be comprised of a leather layer 36 joined with a cushioning layer 38. In the illustrated example, the leather layer 36 may comprise a sheet of natural tanned leather, bonded leather, or synthetic leather-like material that provides a suitably firm support for attachment of the rigid shell 14 and attachment clips 30, 32. The cushioning layer 38 may be, for example, a 2 mm to 5 mm thick sheet of neoprene, also known as polychloroprene, a family of synthetic rubbers that are chemically stable, maintain flexibility over a wide temperature range, and are elastomerically compressible. Neoprene can be produced in either closed-cell or open-cell form. The closed-cell form is waterproof, which provides a moisture barrier for the leather layer 36 and the firearm 16, a more desirable selection for use in the present invention. However, because neoprene is stretchable and elastic in all directions, it would not have sufficient load supporting qualities for use as an IWB holster, particularly in conjunction with a rigid shell 14, without being combined with the relatively non-stretchable outer leather layer 36.

The leather layer 36 and cushioning layer 38 may be secured together by use of an adhesive, such as Super 77® multi-purpose spray adhesive made by 3M Corporation of Minneapolis, Minn. Additionally, if desired, the leather layer 36 and cushioning layer 38 may be secured together adjacent to and around the perimeter of the backing sheet 12 by a line of stitching 40.

Neoprene sheet material made with a smooth fabric layer 42 on one surface can reduce friction and may increase breathability of the cushioning layer 38. In a preferred embodiment of the present invention, this fabric layer 42 is positioned to provide the inwardly oriented face of the backing sheet 12 which contacts the user's skin or undergarments when in use. Enhanced breathability of the neoprene cushioning layer 38 may be provided by using a perforated version of the material, commonly available from many manufacturers of neoprene.

While one embodiment of the present invention has been described in detail, it should be apparent that modifications and variations thereto are possible, all of which fall within the true spirit and scope of the invention. Therefore, the foregoing is intended only to be illustrative of the principles of the invention. Further, since numerous modifications and changes will readily occur to those skilled in the art, it is not intended to limit the invention to the exact construction and operation shown and described. Accordingly, all suitable modifications and equivalents may be included and considered to fall within the scope of the invention.

What is claimed is:

1. A handgun holster for concealment inside a waistband of a lower garment of a user, the holster comprising:
   a support sheet having first and second surfaces, the support sheet comprising at least first and second layers of different material, the first layer comprising a pliable leather material and the second layer comprising a resilient elastomeric cushion material, the second layer being positioned inward toward the user relative to the first layer when the holster is in use;
   a rigid shell member attached to the first surface of the support sheet and forming with the first surface of the support sheet a pocket configured to encase a portion of a handgun;
   at least one garment attachment member on the first surface of the support sheet configured to support the support sheet and shell member inside a waistband of a lower garment of a user.

2. The holster of claim 1, wherein the resilient elastomeric cushion material comprises neoprene.

3. The holster of claim 2, wherein the neoprene is perforated to make it breathable.

4. The holster of claim 1, wherein the second surface comprises a layer of fabric.

5. The holster of claim 1, wherein the first and second layers are secured together by adhesive.

6. The holster of claim 5, wherein the first and second layers are further secured together by peripheral stitching.

7. The holster of claim 1, comprising a plurality of garment attachment members.

8. The holster of claim 1, wherein the garment attachment member comprises a clip that engages an upper edge of the user's lower garment.

9. The holster of claim 1, wherein the garment attachment member comprises a clip that engages a belt worn by the user.

10. The holster of claim 1, wherein the shell member is attached to the support sheet by a plurality of fasteners.

11. The holster of claim 10, wherein the fasteners comprise Chicago screws.

12. The holster of claim 10, wherein the support sheet is configured to provide multiple attachment positions for the shell member.

13. The holster of claim 1, wherein the support sheet is configured to provide multiple attachment positions for the garment attachment member.

* * * * *